ELECTRICAL FILTER

Filed Nov. 20, 1953

INVENTOR.
Gordon L. Fredendall

BY [signature]

ATTORNEY

United States Patent Office 2,855,573

Patented Oct. 7, 1958

2,855,573

ELECTRICAL FILTER

Gordon L. Fredendall, Huntingdon Valley, Pa., assignor to Radio Corporation of America, a corporation of Delaware Application November 20, 1953, Serial No. 393,402

6 Claims. (Cl. 333—73)

This invention relates generally to electrical filtering apparatus, and more particularly to novel and improved filters of a modified multiple bandpass or "comb" type.

There has been disclosed in the prior art filters of a multiple bandpass type, or what may be referred to herein as a "comb" type, i. e. a filter which possesses a series of alternate pass and stop bands, the centers of which are situated at regular intervals in the frequency spectrum. As an example, a coaxial line filter having such a response is discussed in chapter 4 of the book entitled "Wave Filters," by L. C. Jackson, published by Methune and Co. Ltd. in 1944. Such a filter is also the subject of U. S. Patent No. 1,781,469, W. P. Mason, issued on November 11, 1930.

Among other possible uses, a comb filter is of interest in a color television system of the simultaneous subcarrier type, such as one which accords with the signal specification proposed by the National Television Systems Committee (NTSC) to the FCC for adoption as color television signal standards. An explanation of a color television system of this type and its principles and development is contained in the article entitled "Principles and Development of Color Television Systems," by G. H. Brown and D. G. C. Luck, appearing in the June 1953 issue of the RCA Review. Briefly, in such a color television system, color information is added to luminance information through the medium of a modulated color subcarrier which accompanies a broad band luminance signal.

In an article entitled "Optimum Utilization of the Radio Frequency Channel for Color Television," by R. D. Kell and A. C. Schroeder, which appears in the same issue of the RCA Review, the factors which enter into the choice of an optimum frequency for the subcarrier wave in such a color television system are discussed. It is desirable to choose a subcarrier frequency which is an odd multiple of half the frame frequency, and particularly one which is also an odd multiple of half the line frequency, so as to interlace the subcarrier and its sidebands in the frequency spectrum with the harmonics of line and frame frequency and so as to interlace any "dot" reproductions of the subcarrier in the reproduced picture, the common purpose from either point of view being to reduce interference between the brightness video signal and the color subcarrier. The choice of a subcarrier frequency with such a relation to frame and line frequencies thus provides so-called dot interlace or frequency interlace.

The exact placement of a subcarrier frequency of such relationship in the video frequency spectrum is however subject to conflicting desires for choosing a relatively high frequency and a relatively low frequency. To minimize visibility of the subcarrier in a reproduction, it is desirable to make the residual dot structure as fine as possible by selecting a high subcarrier frequency. However, the 6 mc. channel width limitation necessarily imposed by FCC channel allocation requirements, and the practical limitation of bandwidth available for video signals within the 6 mc. band dictated by the necessity of minimizing the appearance of accompanying sound in a receiver's video channels, effectively place a ceiling of approximately 4 mc. on the subcarrier frequency choice.

The reason for desiring a lower subcarrier frequency is based upon the desire for double band transmission of the subcarrier whereby the maximum amount of color information may be conveyed by the modulated subcarrier with a minimum of crosstalk. While a complete analysis of the requisite information content for the subcarrier signal, the causes of crosstalk, etc. is not essential for an understanding of the present invention and may be obtained from the aforementioned articles, it may be noted that two independent pieces of information must be conveyed by the subcarrier in addition to the luminance information contained in the accompanying broad band signal to permit three-color image reproductions. The requisite two pieces of information may be conveyed by the single subcarrier by means of use of both phase and amplitude modulation. However, if single sideband transmission of the phase and amplitude modulated subcarrier is utilized, crosstalk between the two information bearing signals occurs due to the missing sideband. Therefore, to transmit the maximum color information with a minimum of crosstalk it would be desirable to place the subcarrier frequency as low as the frequency corresponding to the mid-point of the effective video band.

In the aforementioned NTSC signal specifications a compromise has been reached between the desire for reduced dot structure visibility and the desire to transmit a maximum amount of color information without crosstalk by placing the subcarrier frequency at a value of 3.579545 mc. This permits double sideband transmission and utilization of the color subcarrier for signal frequencies up to approximately .6 mc., with only single sideband transmission practically permissible for signal frequencies above .6 mc. In a proposed color television system of the type discussed in the aforementioned Brown-Luck article which is in accordance with the aforementioned NTSC signal specifications, for color signals up to approximately the .6 mc. limit, the color subcarrier is both phase and amplitude modulated to permit effective three-color reproduction of relatively large picture areas, while for color signals above this limit the color subcarrier is constant in phase but modulated in amplitude to permit effective two-color reproduction for intermediate area detail. No color information is added to the luminance information contained in the broad band signal for the finest picture detail.

As a result of the location of the color subcarrier frequency at approximately 3.58 mc., which frequency is well within the 4 mc. video band available for utilization by a receiver, a problem is presented if full utilization of this band is desired on the one hand and reduction of visibility of the subcarrier to a safe level is desired on the other hand. In the present practice of the color television receiver art, the color subcarrier and sidebands of a significant magnitude are attenuated in the brightness channel (also referred to as the monochrome or luminance channel) by trap circuits so that appearance of a dot structure in the color reproduction due to partial rectification of the subcarrier components by the reproducing kinescope (and moire between this signal dot structure and the physical dot structure of the phosphor screen in the usual tri-color kinescope) are minimized. The successful use of such trap circuits for this purpose, however, results in substantial attenuation of the high frequency luminance signals and therefore results in a reduction in the resolution of the color reproduction.

It will therefore be appreciated that if the brightness channel were supplied with means for substantially removing the color subcarrier and its significant sidebands therefrom, while having little or no effect on the high frequency components of the luminance signal, the problem would be more satisfactorily solved. Subcarrier visibility could be reduced to an insignificant level without seriously affecting resolution. It is in this connection that a filter of the so-called "comb" type appears of particular interest.

As was previously indicated the choice of color subcarrier frequency as an odd multiple of one half the frame frequency, and particularly as one which is also an odd multiple of half the line frequency, is made with one object of interlacing the color subcarrier and its sidebands with the harmonics of frame and line frequency. The desirability of providing such frequency interlace resides in the fact that the frequency components of an ordinary television signal are generally "clustered" in the frequency spectrum about harmonics of the line frequency. The color subcarrier and its sidebands thereby fall in relatively unused graps in the video frequency spectrum. It would therefore appear that significant advantage could be taken of a comb filter whose pass bands were centered about the harmonics of line frequency, since such a filter should selectively pass the components of the luminance signal while rejecting the color subcarrier and its sidebands.

However, a limitation of the full value of the frequency interlace principle is that the presence of motion in television pictures complicates the situation by introducing video components which are not harmonics of the frame or line frequency but are harmonics of slightly higher or lower frequencies. Therefore use of an unmodified comb filter for the purposes of completely removing the subcarrier components from the brightness channel would appear to be undesirable from the transient point of view, since proper reproduction of motion of a television subject might seriously suffer should desired luminance signal components derived from a moving image fall outside the passbands of the comb filter.

Accordingly the present invention is directed toward a modified comb filter which, when utilized for subcarrier elimination in the brightness channel, has a minimum effect on the reproduction of motion. In accordance with the invention a comb filter is modified so as to fill in the gaps between the passband "teeth" over a desired portion of the filter's response characteristic. In accordance with a particular embodiment of the invention a transmission line, open at the receiving end and terminated at the sending end in the characteristic impedance, is provided with a terminal at its terminated input end. The length of the line is chosen to be equal to $$\frac{1}{f_h\sqrt{LC}}$$

where L, C are the line constants expressed respectively in henries and farads per centimeter, and $f_h$ is equal to the line frequency in cycles per second. The transmission line provides the voltage at the aforesaid terminal with a frequency response characteristic which is sinusoidal about the frequency axis, with a period equal to $f_h$. By adding thereto the voltage at the open end of the transmission line (which has a flat frequency response characteristic), a sum voltage is obtained obeying a frequency response characteristic of the multiple bandpass or comb type, the passband centers being situated at harmonics of the line frequency $f_h$. In addition, the voltage obtained from the terminal at the input end of the line is reversed in polarity and also combined with the voltage obtained from the open end of the line to provide a sum voltage obeying a complementary multiple bandpass or comb characteristic, the passband centers of which fall midway between the passband centers of the first mentioned comb characteristic. The second sum voltage is passed through a lowpass filter having a predetermined cutoff frequency, and the low pass filter output is added to the first sum voltage. The resulting signal obeys a modified comb characteristic, in which the gaps between the passband teeth up to the predetermined cutoff frequency of the low pass filter are filled in to provide a flat passband for all signal frequencies up to this cutoff frequency.

Accordingly a primary object of the present invention is to provide novel and improved electrical filtering apparatus.

A further object of the present invention is to provide a novel and improved filter of a modified multiple bandpass or comb type.

An additional object of the present invention is to provide a comb filter of a modified type in which the gaps between the passband teeth of the filter response characteristic are filled in to provide a relatively wide passband over a desired portion of the characteristic.

Another object of the present invention is to provide novel and improved filtering apparatus for use in the separation of luminance and chrominance information in a simultaneous color television system.

A further object of the present invention is to provide a color television receiver with novel apparatus for removing color subcarrier components from the brightness signal channel with a minimum effect on picture resolution and proper reproduction of motion.

Other objects and advantages of the present invention will be readily appreciated by those skilled in the art after a reading of the following detailed description and an inspection of the accompanying drawings in which:

Figure 1 illustrates in block and schematic form apparatus in accordance with an embodiment of the invention for providing a modified comb filter;

Figure 1*a* provides a schematic of a transmission line arrangement illustrated to aid in an explanation of the principles of the invention.

Figures 1, 1A, 2, 3:
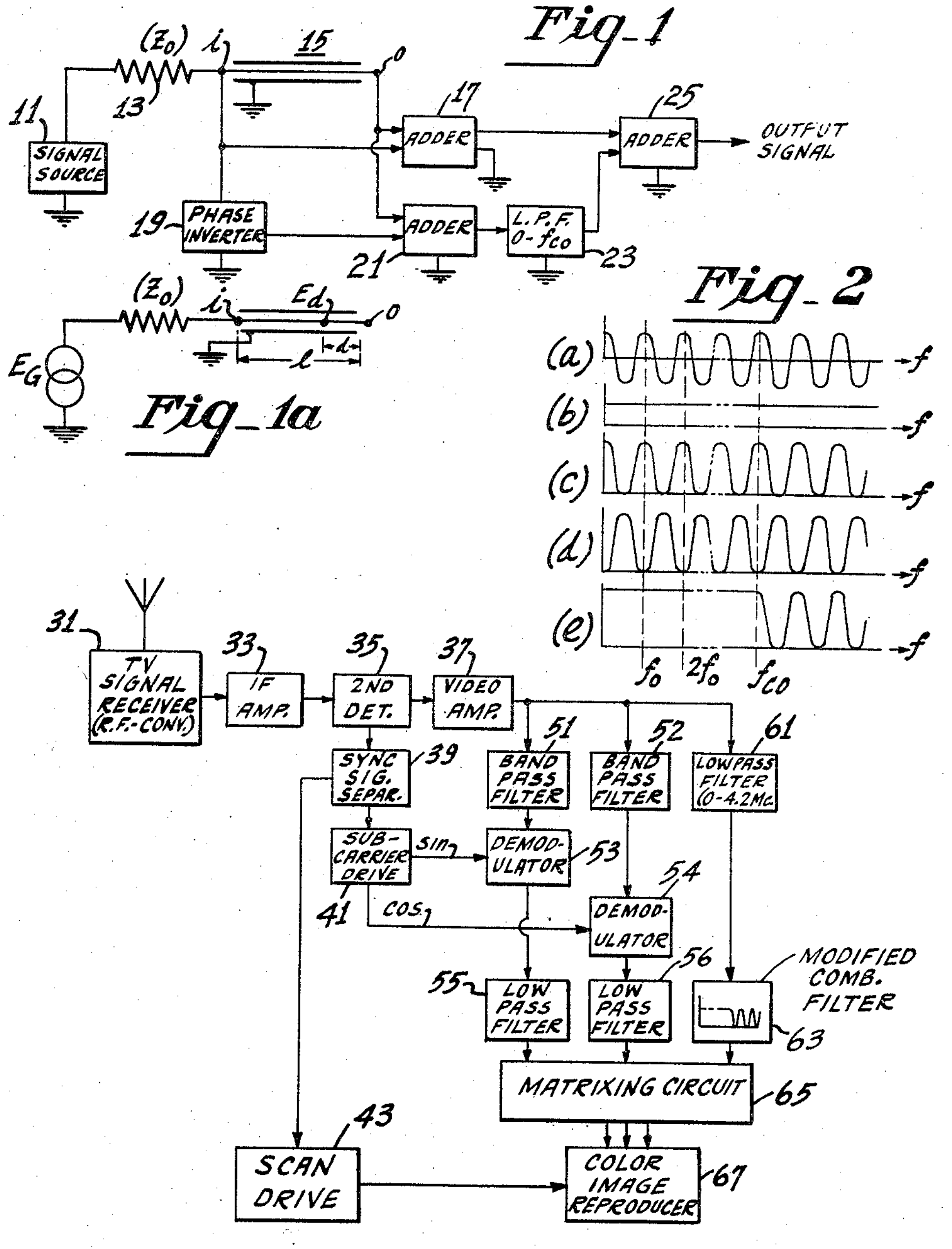
Figure 2 illustrates graphically frequency response characteristics for various portions of the apparatus illustrated in Figure 1.
Figure 3 illustrates in block form a color television receiver utilizing a modified comb filter of the type shown in Figure 1.

Referring to Figure 1 in greater detail, a source of electrical signals 11 is illustrated as coupled via a resistor 13 to one end of a transmission line 15. The impedance of the resistor 13 is chosen such that the transmission line 15 is terminated at its sending or input end *i* in its characteristic impedance $Z_0$. The receiving or output end *o* of the transmission line 15 is open. It may be noted that the line 15 may be an actual transmission line or its artificial equivalent in lumped constants.

The signals appearing at the input end *"i"* of the transmission line 15 are combined with the signals appearing at the output end *"o"* in an adder 17. The signals appearing at the input end *"i"* are also reversed in polarity in a phase inverter 19, and the output thereof combined with the signals appearing at the output end *"o"* in another adder 21. The output of adder 21 is fed through a low pass filter 23 to a third adder 25, where it is combined with the output of adder 17 to provide the filter output signal.

To aid in an understanding of the above described embodiment of the present invention, reference may first be made to Figure 1*a* for an explanation of the signal characteristics obtained at various points on a transmission line which is open at its receiving end and terminated in the characteristic impedance of the line at its sending end. In Figure 1*a*, such a transmission line of length *l* is coupled to a signal generator providing a generator voltage $E_G$. A standard formula for the voltage at a point on such a transmission line a given distance *d* from the receiving or output end *o* of the line is:

$$E_D=E_G\epsilon^{-j\omega l\sqrt{LC}}\cos\omega d\sqrt{LC}$$

where $\omega=2\pi \times$ signal frequency and L, C are the line constants.

Hence the voltage at the input end $i$ of the line is:

$$E_i=E_G\epsilon^{-j\omega l\sqrt{LC}} \cos \omega l\sqrt{LC}$$

The term $\omega l\sqrt{LC}$ shows that the phase is proportional to signal frequency and the term $E_g \cos \omega l\sqrt{LC}$ shows that the amplitude of response varies sinusoidally with signal frequency. If $l$ is chosen to equal $$\frac{1}{f_0\sqrt{LC}}$$

the amplitude factor is $$\cos 2\pi\frac{f}{f_0}$$

and the period of the sinusoidal response variation is $f_0$.

A plot of such a frequency response characteristic is illustrated by curve (*a*) of Figure 2. The voltage at the open output end *o* of the transmission line is however essentially independent of frequency as illustrated by curve (*b*) of Figure 2. By combining the signals from *i* and *o* in the adder 17, an output signal is obtained which obeys a frequency response characteristic which is essentially the sum of the characteristics "*a*" and "*b*" as illustrated by curve (*c*) of Figure 2.

It may also be appreciated that by reversing the polarity of the signals appearing at *i*, as in the phase inverter 19, and combining the inverted signals with the signals appearing at *o*, as in adder 21, an output signal is obtained which obeys a frequency response characteristic which is in effect the complement of characteristic "*c*" illustrated by curve (*d*) of Figure 2. If the signals obtained in the latter operation are limited in frequency to some predetermined cutoff frequency ($f_{co}$), as by low pass filter 23, and combined with signals obeying characteristic "*c*" but not limited in frequency, as in adder 25, a filter output signal is obtained which obeys a frequency response characteristic which is essentially the sum of characteristics "*c*" and "*d*" up to the predetermined cutoff frequency ($f_{co}$) but corresponding to characteristic "*c*" alone above $f_{co}$. Such an overall characteristic is illustrated by curve (*e*) of Figure 2.

Thus it may be seen that the combination of apparatus illustrated in Figure 1 provides a filter having a flat response characteristic over a low frequency portion of the frequency spectrum and having a comb characteristic over the remaining portions of the frequency spectrum. It will be readily appreciated that the comb characteristic may be "filled in" in any desired portion of the frequency spectrum in accordance with the invention by suitable choice of the filter 23. That is, by substitution of a high pass or bandpass filter for the illustrative low pass filter 23, the filling in of the comb may instead be achieved at the high frequency end of the spectrum or at an intermediate region thereof.

The filling in for low frequencies has been chosen for illustration because of the particular significance of a characteristic such as illustrated by curve (*e*) in a simultaneous color television system, as previously discussed. By choosing $f_0$ equal to the line frequency of the color television system (approximately 15,734.3 C. P. S. in the NTSC signal specifications) and by choosing $f_{co}$ equal to a frequency falling below the subcarrier frequency of the system by a suitable interval, a modified comb filter is provided which may serve to advantage in removing the color subcarrier and its significant sidebands from the brightness channel of a color receiver with minimum damage to picture resolution and proper motion reproduction.

Figure 3 illustrates in block form a color television receiver utilizing a modified comb filter of the type shown in Figure 1 for the above indicated purpose. The illustrated receiver is generally representative of presently contemplated color receivers for a simultaneous subcarrier type color television system, and is in general accord with the principles and apparatus discussed in the aforementioned articles in the RCA Review. Carrier waves modulated by a composite color picture signal are illustrated as being received by conventional signal receiving apparatus 31, which may include the usual R. F. tuner, converting apparatus, etc. The I. F. output of the receiver 31 is passed through an I. F. amplifier 33. The video frequency signals are recovered from the modulated I. F. carrier in the detector 35 and amplified in the video amplifier 37. Synchronizing information is derived from the recovered signals in the sync separator 39 and utilized to synchronously control the receiver's scan drive apparatus 43 and subcarrier drive apparatus 41. Respective color-mixture signals (e. g. narrow band $E_Q$ signals and wider band $E_I$ signals, discussed in detail in the aforementioned articles) are recovered from the video signal output of amplifier 37 in respective color demodulator channels which include bandpass filters 51 and 52 of respectively appropriate passbands, demodulators 53 and 54 receiving respectively appropriate phases of the output of the subcarrier drive apparatus 41, and low pass filters 55 and 56 having the respectively appropriate narrow and wider band responses.

The receiver is also provided with a brightness channel through which the broad band monochrome portion of the composite color picture signal may pass. In accordance with the invention this brightness channel is illustrated as including a low pass filter 61 having the desired wide band response (approximately 0 to 4.2 mc., for example) and a modified comb filter 63 which may be of the type illustrated in Figure 1. The outputs of the brightness channel and two color channels are suitably combined in the matrixing circuits 65 of the receiver to obtain the simultaneous color signals which may be applied to appropriate elements of the color image reproducer 67, the deflection circuits of which are suitably energized by the synchronously controlled scan drive apparatus 43, to provide a color reproduction of the televised image.

As was previously discussed, it is desirable to remove the color subcarrier components from the brightness channel so that appearance of a subcarrier dot structure in the color reproduction with resultant loss of resolution and possible moire between this signal dot structure and the physical dot structure of the prosphor screen may be avoided. The presence in the brightness channel of the modified comb filter 63, having a characteristic such as illustrated by curve (*e*) of Figure 2, permits substantial removal of the subcarrier and its sidebands in a selective manner whereby attenuation of the interspersed high frequency luminance signals is substantially avoided, thus permitting high resolution color reproductions of the image. This selective removal of the subcarrier components is achieved by the modified comb filter, however, with minimum damage to the proper reproduction of image motion, since the filter modification to eliminate stop bands up to the predetermined cutoff frequency permits passage of all luminance signal components up to $f_{co}$, whether harmonically related to line and frame frequencies or not. By choosing the cutoff frequency $f_{co}$ at some value such as 3.2 mc., sufficiently below the subcarrier frequency in the illustrative system so that stop bands are provided for a majority of the lower side bands of the subcarrier of significant amplitude, a proper rendition of image motion may be achieved while reducing subcarrier visibility to a safe level.

While Figure 3 has illustrated use of a modified comb filter in accordance with the invention in a color receiver, it will also be appreciated that advantage of the modified comb filter may also be taken in accordance with the invention by its use in the video signal channel of a black-and-white receiver whereby loss of resolution in a black-and-white reproduction of color television signals of the simultaneous subcarrier type, due to partial rectification by the reproducing kinescope of subcarrier components reaching the kinescope, may be substantially avoided.

Having thus described my invention, what is claimed is:

1. An electrical filter comprising the combination of a transmission line open at its receiving end and terminated at its sending end in the characteristic impedance of said line, means for applying signals to said terminated sending end, signal adding means coupled to both of said ends of said transmission line, a phase inverter coupled to said sending end, additional signal adding means coupled to said phase inverter and said receiving end, filter means coupled to said additional adding means and having a single restricted passband, and further signal adding means coupled to said first adding means and to said filter means.

2. In a signalling system, apparatus comprising the combination of a transmission line terminated at its input end by its characteristic impedance and open at its output end, means for applying signals to said terminated input end, means for combining signals appearing at said output end with signals appearing at said input end, means for reversing in polarity the signals appearing at said input end, means for combining said polarity reversed signals with signals appearing at said output end, a network having a predetermined restricted passband coupled to said latter signal combining means, and means for adding the output of said first signal combining means with the output of said restricted passband network.

3. A modified comb filter comprising the combination of means including a transmission line for providing a first network having a first multiple bandpass characteristic, additional means including said transmission line for providing a second network having a different multiple bandpass characteristic which is substantially complementary to said first multiple bandpass characteristic, a filter having a predetermined restricted passband coupled to said second network, electrical input signal applying means comprising means for applying signals to said first and second networks, and electrical output signal deriving means comprising signal adding means coupled to said first network and to said filter.

4. In a color television system of the simultaneous subcarrier type wherein a composite color picture signal including a broad band monochrome signal is utilized in a receiver including a brightness channel, means for selectively removing components of said subcarrier from said brightness channel comprising a transmission line open at one end and terminated in its characteristic impedance at the other end, means for applying said composite signals to said terminated end, means for adding the signals at said open end to the signals at said terminated end, a phase inverter coupled to said terminated end, additional means for adding signals appearing at said open end to the signal output of said phase inverter, a low pass filter coupled to said latter signal adding means, and means for combining the signal output of said low pass filter with the signal output of said first signal adding means.

5. In a color television receiver of the type adapted to receive a composite color picture signal including a broad band monochrome signal and a modulated color subcarrier, the frequency of said color subcarrier being an odd multiple of one-half the line scanning frequency of said receiver, the combination of a network having a frequency response characteristic comprising a series of successive pass and stop bands, the stop bands of said characteristic being centered about odd harmonics of half the line frequency of said receiver, and the passbands of said frequency response characteristic being centered about even harmonics of said half line frequency; a second network having a frequency response characteristic also comprising a series of successive pass and stop bands, the stop bands of said latter frequency response characteristic being centered about even harmonics of said half line frequency and the passbands of said latter frequency response characteristic being centered about odd harmonics of said half line frequency; a low pass filter coupled to said second network and having a cutoff frequency lower than the frequency of said subcarrier; signal adding means coupled to said first network and to said low pass filter; means for applying said composite color picture signal to said networks; monochrome signal utilization apparatus; and means for applying the signal output of said signal adding means to said monochrome signal utilization apparatus.

6. In a color television receiver brightness channel, a filter comprising the combination of a first comb filter, a second comb filter having a frequency response characteristic which is essentially complementary to the frequency response characteristic of said first comb filter, means for applying a common video signal to said comb filters, and means for coupling each of said comb filters to a signal adding means to provide a video signal output, one of said coupling means having a more restricted frequency passband than the other of said coupling means.

References Cited in the file of this patent

UNITED STATES PATENTS

| | | |
|---|---|---|
| 1,902,031 | Holden | Mar. 21, 1933 |
| 1,956,121 | Craig | Apr. 24, 1934 |
| 2,124,599 | Wiener et al. | July 26, 1938 |
| 2,263,376 | Blumlein et al. | Nov. 18, 1941 |
| 2,585,532 | Briggs | Feb. 12, 1952 |
| 2,636,937 | Fredendall et al. | Apr. 28, 1953 |
| 2,729,698 | Fredendall | Jan. 3, 1956 |